US012694074B2

(12) United States Patent
Straehle

(10) Patent No.: US 12,694,074 B2
(45) Date of Patent: Jul. 28, 2026

(54) METHOD AND DEVICE FOR ASCERTAINING A CLASSIFICATION AND/OR A REGRESSION RESULT WHEN MISSING SENSOR DATA

(71) Applicant: Robert Bosch GmbH, Stuttgart (DE)

(72) Inventor: Christoph-Nikolas Straehle, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 538 days.

(21) Appl. No.: 17/658,044

(22) Filed: Apr. 5, 2022

(65) Prior Publication Data

US 2022/0327332 A1 Oct. 13, 2022

(30) Foreign Application Priority Data

Apr. 9, 2021 (DE) ..................... 10 2021 108 907.7

(51) Int. Cl.
| | |
|---|---|
| *G06F 18/24* | (2023.01) |
| *G06F 17/18* | (2006.01) |
| *G06F 18/214* | (2023.01) |
| *G06T 12/30* | (2026.01) |

(52) U.S. Cl.
CPC .............. *G06F 18/24* (2023.01); *G06F 17/18* (2013.01); *G06F 18/214* (2023.01); *G06T 12/30* (2026.01)

(58) Field of Classification Search
CPC ........ G06F 18/24; G06F 17/18; G06F 18/214; G06T 11/008; G06V 10/766; G06V 10/82; G06V 20/56; G06V 10/764; G06N 3/088; G06N 20/00
See application file for complete search history.

(56) References Cited

U.S. PATENT DOCUMENTS

| | | | |
|---|---|---|---|
| 2011/0231016 A1* | 9/2011 | Goulding ............. | G05D 1/0088 |
| | | | 901/1 |
| 2018/0068033 A1* | 3/2018 | Bandyopadhyay .... | G01R 22/10 |
| 2021/0097401 A1* | 4/2021 | Ramalho ............... | G06N 3/045 |

OTHER PUBLICATIONS

"Durrant-Whyte, Introduction to Estimation and the Kalman Filter, 2001, Australian Centre for Field Robotics, Version 2.2, pp. 1-129" (Year: 2001).*
Kashif et al., Multi Variate Probabilistic Time Series Forecasting via Conditioned Normalizing Flows, Jan. 14, 2021,ICLR (Year: 2021).*
Shao et al., "Reconstruction of Missing Big Sensor Data," Cornell University, 2017, pp. 1-13. <https://arxiv.org/pdf/1705.01402.pdf> Downloaded Apr. 4, 2022.

(Continued)

*Primary Examiner* — Oneal R Mistry
*Assistant Examiner* — Justin Philip Cascais
(74) *Attorney, Agent, or Firm* — NORTON ROSE FULBRIGHT US LLP

(57) ABSTRACT

A computer-implemented method for ascertaining a classification and/or a regression result based on the plurality of sensor values. The method includes: ascertaining a plurality of hypotheses regarding a missing sensor value using a machine learning system; ascertaining a plurality of outputs, an output being based in each case on the plurality of sensor values and a hypothesis and the output characterizing a classification and/or a regression result; providing an aggregation of the plurality of outputs as the classification and/or the regression result.

10 Claims, 8 Drawing Sheets

(56)                 References Cited

OTHER PUBLICATIONS

Berend, et al.:"Csats Are Not Fish: Deep Learning Testing Calls for Out-Of-Distribution Awareness", Proceedings of the 2020 35th IEEE/ACM International Conference on Automated Software Engineering (ASE), pp. 1041-1052.

Gauerhof, et al.: "Considering Reliability of Deep Learning Function to Boost Data Suitability and Anomaly Detection", 2020 IEEE International Symposium on Software Reliability Engineering Workshops (ISSREW) IEEE, (2020), pp. 249-254.

Schorn and Gauerhof: "FACER: A Universal Framework for Detecting Anomalous Operation of Deep Neural Networks", 2020 IEEE 23rd International Conference on Intelligent Transportation Systems (ITSC), IEEE, (2020), pp. S. 1-6.

* cited by examiner control system

40 actuator

10

401

30

300 control system

40

30

10a

400 control system

10a

40

30 sensor

500

METHOD AND DEVICE FOR ASCERTAINING A CLASSIFICATION AND/OR A REGRESSION RESULT WHEN MISSING SENSOR DATA

CROSS REFERENCE

The present application claims the benefit under 35 U.S.C. § 119 of German Patent Application No. DE 10 2021 108 907.7 filed on Apr. 9, 2021, which is expressly incorporated herein by reference in its entirety.

FIELD

The present invention relates to a method for ascertaining at least one first sensor value of a missing sensor datum, to a training device, to a control device, to a computer program and to a machine-readable storage medium.

BACKGROUND INFORMATION

A method for the reconstruction of missing sensor data is described in Yongshuai Shao and Zhe Chen "Reconstruction of Missing Big Sensor Data", May 3, 2017, available online at https://arxiv.org/pdf/1705.01402.pdf.

Many technical systems perceive their surroundings using suitable sensors. Due to technical circumstances, when perceiving the environment using sensors it often happens that portions of the sensor values are missing in a stream of sensor values. This may occur, for example, when sensor values are retrieved from the sensor at time intervals. In this connection, it may happen both in a transmission via a transmission cable as well as in a wireless transmission that due to environmental influences, for example, such as electromagnetic interference fields, portions of the sensor values are not transmitted or a transmission is subject to interference in such a way that the sensor values are faulty and are sorted out, e.g., on the basis of a checksum.

Missing sensor values represent a problem for a technical system, since at times it is not possible to perceive the environment or that the environment cannot be perceived with sufficient accuracy and it may be impossible even to estimate a state of the environment.

It is possible, for example, to reconstruct missing sensor values. For example, missing sensor values may be ascertained, in the sense of estimated, on the basis of other sensor values. In combination with the other sensor values, the missing sensor values may then be supplied to the technical system, which is subsequently able to ascertain from these a state of the environment.

For this purpose, however, conventional methods consider merely the sensor data themselves. The relationship between a state of the environment and sensor values, which are used for ascertaining the state of the environment, is often non-linear. Typical examples of this are the ascertainment of positions of objects in an image or the measurements of injection periods in an internal combustion engine using a piezoelectric sensor.

SUMMARY

The inventors were able to discover that the ascertainment of a state of the environment based merely on an estimation of the missing sensor value and the other sensor values may result in an inaccurate ascertainment of the state of the environment.

An advantage of the method in accordance with the present invention is that multiple hypotheses are ascertained for a missing sensor value by using a method of machine learning, a first output of the technical system regarding the state of the environment being in each case ascertained for a hypothesis and the ascertainment of the state of the environment subsequently leading to an expected value of the first outputs. Advantageously, multiple values are thereby ascertained for the missing sensor value, which the missing sensor value could have assumed. Subsequently, it is not the expected value of these hypotheses that is used, but rather an output of the technical system is respectively ascertained (that is, an estimate of the state of the environment is ascertained) for the hypotheses. The final output of the technical system is then an expected value about the respectively ascertained outputs.

Expressed differently, in the presented method in accordance with an example embodiment of the present invention, the missing sensor value is not regarded as an individual value, but rather as a random variable. This random variable entails a second random variable, namely, the output of the technical system with respect to the other sensor values and the random variables.

In the case of a missing sensor value, the accuracy of the determination of the state of the environment is thereby advantageously increased.

In a first aspect, the present invention relates to a computer-implemented method for ascertaining a classification and/or a regression result based on the plurality of sensor values. In accordance with an example embodiment of the present invention, the method comprises the steps:

ascertaining a plurality of hypotheses regarding a missing sensor value using a machine learning system;

ascertaining a plurality of outputs, an output being ascertained in each case on the basis of the plurality of sensor values and a hypothesis by way of a model and the output characterizing a classification and/or a regression result;

providing an aggregation of the plurality of outputs as the classification and/or the regression result.

The method may be understood in such a way that multiple hypotheses are generated for the missing sensor value, which in each case characterize a possible value of the missing sensor value, and subsequently an expected output of the model is ascertained on the basis of these hypotheses.

A sensor value may be understood as a value that is ascertained by a sensor. A sensor value may in particular also comprise multiple scalar values, for example in the form of a vector.

A classification may be ascertained based on the plurality of the sensor values. Alternatively or additionally, it is also possible to use the sensor values as input of a regression method in order to ascertain a regression result. A regression result may be understood as a real value or a plurality of real values, which is or are ascertained by the regression method.

The model may be understood as a device, which is configured to perform a classification and/or regression based on the sensor data. The model may be a rule-based model, which ascertains on the basis of a plurality of sensor values a corresponding state of the environment, which is characterized by the sensor values. Alternatively, it is also possible that the model is a statistical model, in particular a model from the field of machine learning, such as a neural network, for example.

If the classification is to be ascertained from the plurality of outputs, then the aggregation may be ascertained for example by way of majority voting over the plurality of outputs. If the classification is characterized by probabilities or logits, then it is also possible to ascertain the aggregation by way of a normalized sum. In particular, the probabilities or logits may be combined in the form of a vector, an average value of the vectors of the outputs being ascertained for ascertaining the aggregation.

If the regression result is to be ascertained from the plurality of outputs, then it is possible to provide in particular an expected value of the outputs as the regression result.

In one development of the method of the present invention, it is also possible that multiple sensor values are missing and that a plurality of hypotheses is ascertained for each of the missing values. The sensor values may characterize for example pixels of an image, a sensor recording the image being for example a LIDAR sensor, a camera, a radar sensor or an ultrasonic sensor. In the event that multiple pixels of an image are deemed missing (for example on the basis of a check number or checksum), multiple hypotheses may be respectively ascertained for the missing pixel values. Generally, this development is not limited to pixel values, however, and may equally be applied to other types of sensor values.

It is generally possible for the plurality of sensor values to characterize a spatial arrangement, for example in the form of an image. Alternatively, it is also possible that the sensor values respectively characterize elements of a time series. For example, the sensor values may characterize a plurality of sampling points of an audio signal. Alternatively, it is also possible that the sensor values characterize measurements of a piezoelectric sensor.

The missing sensor value may be understood as a sensor value that originally would have been part of the plurality of sensor values, but which was lost prior to the processing of the plurality of sensor values (for example by a faulty transmission of the sensor values) or was characterized as faulty.

In a preferred development of the method of the present invention, the ascertainment of the expected value of the output may comprise the following steps:

ascertaining a plurality of first outputs of the model, in each case one output of the model being ascertained with respect to the plurality of sensor values and of a hypothesis;

providing an expected value of the plurality of first outputs as the expected value of the output.

This procedure may be understood in such a way that in each case a hypothesis ascertained by the machine learning system is supplied to the model in place of the missing sensor value together with the plurality of sensor values. In other words, the model ascertains a first output for the case in which the missing sensor value would have assumed the value of the hypothesis. This is done for a plurality of hypotheses in order thus to ascertain multiple first outputs. An expected value of the first outputs may be provided as the expected value of the output.

An advantage of this method is that the expected value of the output characterizes an output that is the most probable when considering the various hypotheses. It is thereby possible, in spite of the uncertainty regarding the actual value, to determine very precisely, which output would have been expected from the system had the missing sensor value been available. A classification accuracy of the classification and/or an accuracy of the regression result is thereby improved further.

In a preferred development of the method of the present invention, it is possible that the machine learning system ascertains a hypothesis based on the plurality of sensor values.

The machine learning system thus preferably characterizes a conditional probability distribution, the probability distribution characterizing a probability or a probability density of the missing sensor value given the plurality of sensor values. The machine learning system is thus able to ascertain hypotheses for the missing sensor value among the available sensor values of the plurality of sensor values (the condition of the probability distribution). The plurality of sensor values may therefore be understood as an input of the machine learning system, for which the machine learning system is to estimate a missing value. For ascertaining the plurality of hypotheses, draws may then be performed from the conditional probability distribution characterized by the machine learning system, it being possible to understand a draw respectively as a hypothesis.

Due to the ascertainment of the hypotheses based on the conditional probability distribution, the hypotheses are able to delimit an actual value of the missing sensor value very accurately. Furthermore, the output is ascertained not only on the basis of a hypothesis of the missing sensor value, but based on a plurality of hypotheses, the selection of the hypotheses being suitably limited by the machine learning system. This makes it possible to increase the classification accuracy and/or the accuracy of the regression result further.

In a preferred development of the method of the present invention, the machine learning system may comprise a conditional normalizing flow, by which the hypothesis is ascertained based on the plurality of sensor values.

The advantage of using a conditional normalizing flow is that this type of model of machine learning is able to ascertain a conditional probability very accurately. This increases the classification accuracy and/or the accuracy of the regression result further.

In a preferred development of the method of the present invention, it is furthermore possible to ascertain, in addition to the classification and/or in addition to the regression result, a dispersion value, the dispersion value characterizing a dispersion of the first outputs of the model.

The dispersion value may be understood in such a way that it characterizes an uncertainty with regard to the classification and/or with regard to the regression result. A high dispersion value would accordingly express an increased uncertainty. In other words, a high dispersion value may be understood in such a way that the ascertained expected value deviates with high probability from an output, which would have been obtained, if the missing sensor value had been available, that is, if it had not been missing.

In the various developments of the method of the present invention, an actuator may be controlled based on the classification and/or based on the regression result and/or based on the dispersion value.

It is possible, for example, that a control system carries out the method for the classification and/or for the ascertainment of a regression result and subsequently selects a control signal of an actuator based on the ascertained classification and/or the ascertained regression result and/or the dispersion value. In the case of a high dispersion, it is possible that the actuator is controlled, for example, in such a way that a scope of functions of the actuator or a possible value range of the actuator is limited.

The actuator may be part of a robot, for example, and may be, e.g., a motor, a brake or a steering system. In case of high uncertainty, for example, a maximum speed of the motor may be reduced, a maximum brake force of the brake may be reduced or the robot may be braked by the brake. Generally, it is thus possible to achieve a conservative behavior of the robot, if the missing sensor value allows only for a classification and/or a regression result with high uncertainty. This advantageously improves the control of the robot when a sensor value is missing.

In accordance with an example embodiment of the present invention, it is furthermore possible that the machine learning system is trained on the basis of a training data set, the training data set comprising a plurality of training data, a training datum comprising a plurality of sensor values and the training comprising the following steps:

selecting a training datum from the training data set;
  selecting a sensor value of the training datum;
  training the machine learning system in such a way that the machine learning system ascertains the selected sensor value based on the sensor values of the training datum except for the selected sensor value.

The training may be understood in such a way that for a plurality of sensor values respectively an absence of one of the sensor value is simulated. The machine learning system, for example the conditional normalizing flow, may then be trained to predict this sensor value given the other sensor values of the plurality of sensor values. Advantageously, this method may be carried out entirely as unsupervised learning. The characteristic of unsupervised learning dispenses with the need of a manual annotation of the training data, which is generally very time-consuming. The training method is therefore able to process more data, which increases a predictive accuracy of the machine learning system.

The training data may be ascertained for example by measurements using a sensor. It is also possible that training data are recorded during the operation of a device, which carries out the method for ascertaining the classification and/or the regression result, and that the machine learning system continues to be trained in the ongoing operation of the device.

Preferably, the training datum may be randomly selected from the plurality of training data. Preferably, the sensor value may be randomly selected from the plurality of sensor values of the training datum.

The random selection prevents the machine learning system from receiving a bias. This improves the predictive accuracy of the machine learning system further.

Furthermore, this development of the method may be understood in such a way that the model is trained so that it learns to ascertain an arbitrary missing sensor value. Advantageously, the machine learning system is therefore able to handle missing sensor values that are missing anywhere in the plurality of sensor values.

Specific embodiments of the present invention are explained in greater detail below with reference to the figures.

DETAILED DESCRIPTION OF EXAMPLE EMBODIMENTS

Figure 1:
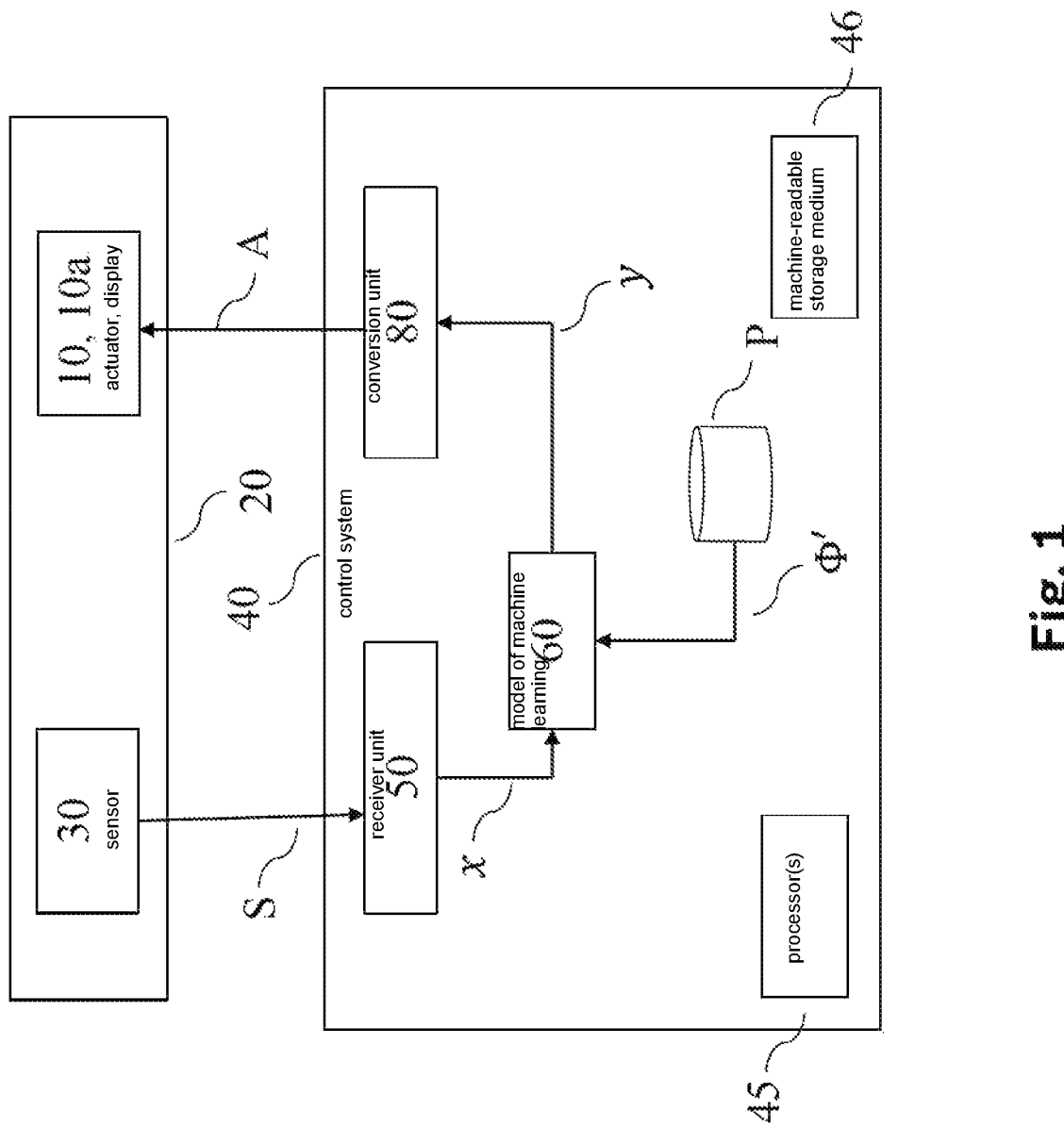
FIG. 1 shows schematically a structure of a control system for controlling an actuator, in accordance with an example embodiment of the present invention.

FIG. 1 shows an actuator (10) in its surroundings (20) in interaction with a control system (40). At preferably regular time intervals, the surroundings (20) are detected in a sensor (30), in particular an imaging sensor such as a camera sensor, which may also be given by a plurality of sensors, for example a stereo camera. The sensor ascertains sensor values (S), which are transmitted to the control system (40). The control system (40) thus receives a plurality of sensor values (S). From this, the control system (40) ascertains control signals (A), which are transmitted to the actuator (10).

In further exemplary embodiments of the present invention, the sensor (30) may also comprise multiple sensors, which transmit accordingly their sensor values (S) to the control system (40).

Control system (40) receives the plurality of sensor values (S) of sensor (30) in a receiver unit (50), which converts the plurality of sensor values (S) into a plurality of input signals (x). For example, the input signals (x) may be ascertained by preprocessing the sensor values. In further exemplary embodiments it is also possible to use the sensor values (S) directly as input signals (x).

The sequence of input signals (x) is supplied to a model (60) of machine learning. The model (60) may be a neural network, for example.

The model (60) is preferably parameterized by parameters 4), which are stored in a parameter store (P) and are provided by the latter.

From the input signals (x), model (60) ascertains output signals (y). The output signals (y) are supplied to an optional conversion unit (80), which ascertains control signals (A) from the output signals, which are supplied to actuator (10) so as to control actuator (10) accordingly.

The receiver unit (50) also ascertains whether a sensor value (S) is missing or was incorrectly transmitted in the plurality of sensor values (S). Preferably, this may be accomplished via a checksum of the sensor values and/or a timeout function. The timeout function ascertains in this instance the last point in time of a transmission of a sensor value (S). If the last point in time is further in the past than a specifiable period of time, then a sensor value (S) may be considered missing.

If no missing sensor value (S) is determined, then the output signal (y) with respect to the input signals (x) is directly forwarded to the conversion unit (80).

If it is determined that a sensor value (S) is missing, the receiver unit ascertains a plurality of hypotheses regarding the missing sensor value (S). For this purpose, a conditional normalizing flow may preferably be used, which is designed to ascertain hypotheses for the missing sensor value on the basis of the plurality of sensor values (S).

Subsequently, an output signal (y) of model (60) is respectively ascertained for the hypotheses, the output signal (y) being ascertained with regard to the hypothesis and the plurality of sensor values (S). In this manner, preferably as many output signals (y) are ascertained as there are hypotheses. The conversion unit (80) receives the output signals (y) thus ascertained and ascertains on the basis of the output signals (y) an expected output signal. If the output signals (y) exist in the form of scalar values or vectors, then the expected output signal may be ascertained for example as an average value or average vector. The expected output signal may also be understood as an expected value of the output signal.

Alternatively or additionally, it is also possible that a dispersion of the output signals (y) ascertained for the hypotheses is ascertained, e.g. a variance or a standard deviation.

The conversion unit (80) ascertains the control signals (A) as a function of the expected output signal and/or as a function of the dispersion.

The actuator (10) receives the control signals (A), is controlled accordingly and performs a corresponding action. In this connection, the actuator (10) may comprise a (not necessarily structurally integrated) control logic, which ascertains a second control signal from the control signal (A), by which the actuator (10) is then controlled.

In further specific embodiments of the present invention, the control system (40) comprises the sensor (30). In still further specific embodiments, the control system (40) comprises, alternatively or additionally, the actuator (10).

In further preferred specific embodiments, the control system (40) comprises at least one processor (45) and at least one machine-readable storage medium (46), on which instructions are stored, which, when they are executed on the at least one processor (45), prompt the control system (40) to carry out the method according to the present invention.

In alternative specific embodiments, as an alternative or in addition to the actuator (10), a display unit (10a) is provided, which is likewise controlled by the control signals (A).

Figure 2:
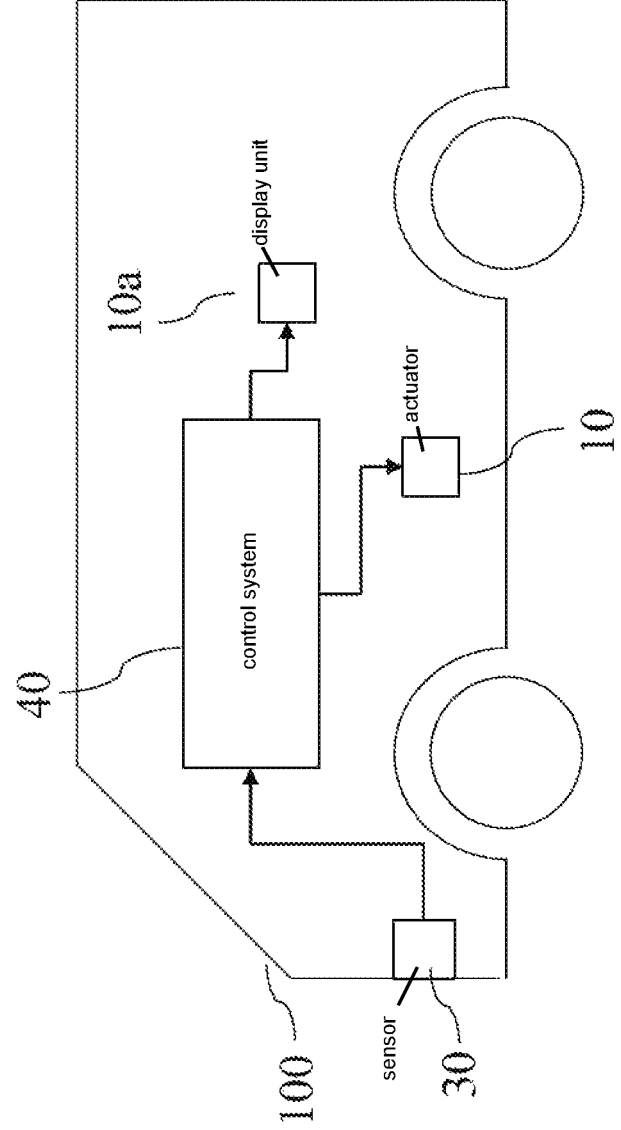
FIG. 2 shows schematically an exemplary embodiment for controlling an at least partially autonomous robot, in accordance with the present invention.

FIG. 2 shows how the control system (40) may be used for controlling an at least partially autonomous robot, in this case an at least partially autonomous motor vehicle (100).

Sensor (30) may be for example a video sensor preferably situated in the motor vehicle (100). The input signals (x) in this case may be understood as input images and the model (60) as an image classifier.

The image classifier (60) is designed to identify objects detectable in the input images (x).

The actuator (10) preferably situated in the motor vehicle (100) may be for example a brake, a drive or a steering system of the motor vehicle (100). The control signal (A) may then be ascertained in such a way that the actuator or the actuators (10) are controlled in such a way that the motor vehicle (100) for example prevents a collision with the objects identified by image classifier (60), in particular, if these are objects of specific classes, e.g., pedestrians.

The missing sensor values (S) may be in particular missing or faulty pixels of an image of the video sensor (30). If the dispersion is too great relative to a specifiable threshold value, vehicle (100) may be controlled for example in such a way that a driving behavior of the vehicle is safer. Vehicle (100) may be braked, for example, or a motor of vehicle (100) may be controlled so as to reduce a maximum speed.

Alternatively or additionally, the control signal (A) may be used to control the display unit (10a) and display the identified objects, for example. It is also possible that the display unit (10a) is controlled using the control signal (A) in such a way that it outputs a visual or acoustic warning signal when it is ascertained that motor vehicle (100) threatens to collide with one of the identified objects. The warning by way of a warning signal may also occur via a haptic warning signal, for example via a vibration of a steering wheel of motor vehicle (100). Alternatively or additionally, it is also possible that the dispersion is suitably displayed on the display unit (10a), e.g. by colorization of an image of video sensor (30).

Alternatively, the at least one partially autonomous robot may also be another mobile robot (not shown), for example one that moves by flying, swimming, diving or walking. The mobile robot may also be for example an at least partially autonomous lawn mower or an at least partially autonomous cleaning robot. In these cases as well, the control signal (A) may be ascertained in such a way that the drive and/or steering system of the mobile robot are controlled in such a way that the at least partially autonomous robot for example prevents a collision with objects identified by image classifier (60).

Figure 3:
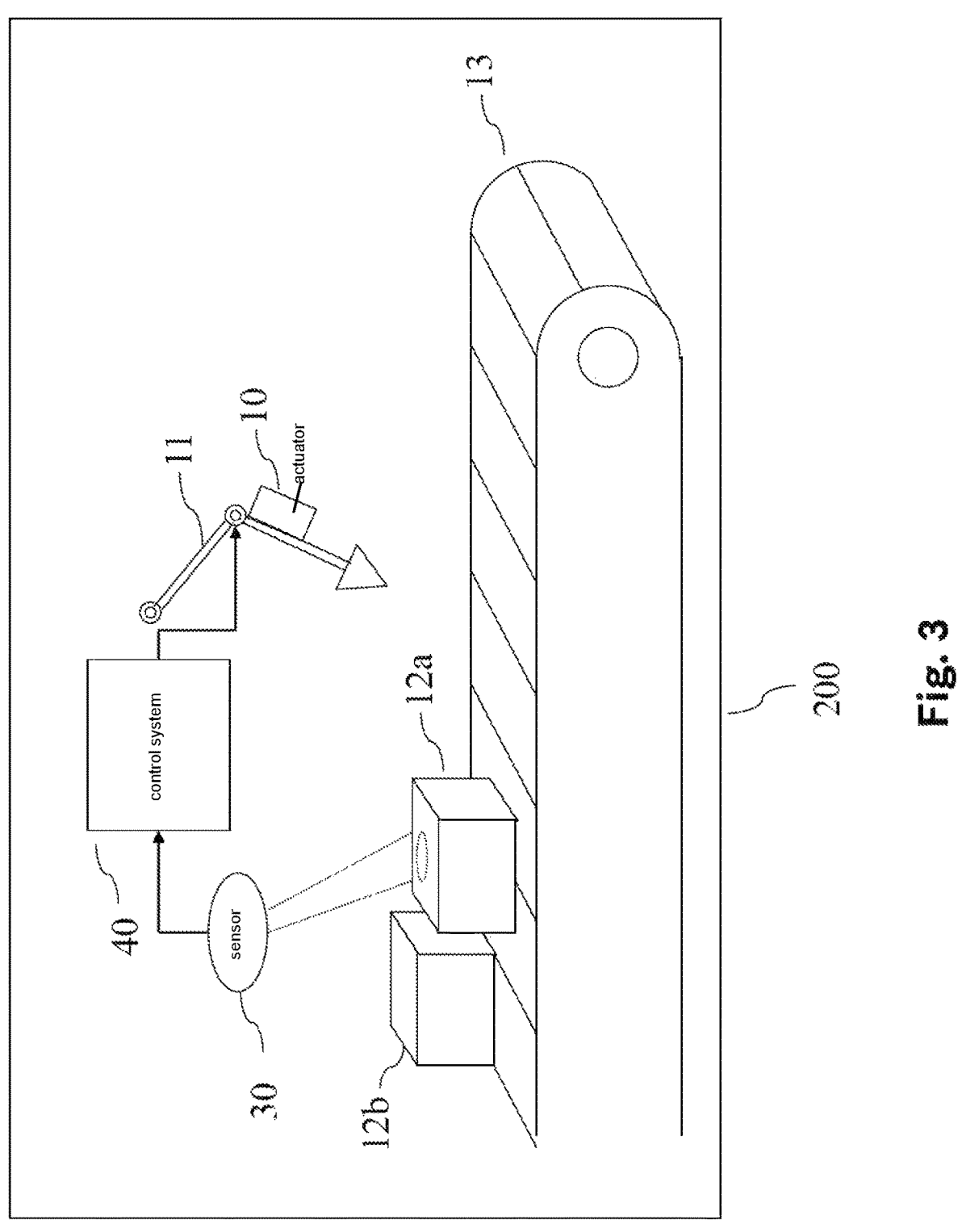
FIG. 3 shows schematically an exemplary embodiment for controlling a manufacturing system, in accordance with the present invention.

FIG. 3 shows an exemplary embodiment, in which the control system (40) is used to control a manufacturing machine (11) of a manufacturing system (200), in that an actuator (10) controlling the manufacturing machine (11) is controlled. The manufacturing machine (11) may be for example a machine for punching, sawing, drilling and/or cutting. It is furthermore possible that the manufacturing machine (11) is developed to grasp a manufacturing product (12a, 12b) using a gripper.

Sensor (30) may then be for example a video sensor, which detects e.g. the conveyor surface of a conveyor belt (13), it being possible for manufacturing products (12a, 12b) to be located on the conveyor belt (13). The input signals (x) are in this case input images (x), and the model (60) is an image classifier. The image classifier (60) may be configured for example to ascertain a position of the manufacturing products (12a, 12b) on the conveyor belt. It is then possible to control the actuator (10) controlling the manufacturing machine (11) as a function of the ascertained positions of the manufacturing products (12a, 12b). For example, actuator (10) may be controlled in such a way that it punches, saws, drills and/or cuts at a predetermined location of the manufacturing product (12a, 12b).

It is furthermore possible that the image classifier (60) is developed to ascertain, as an alternative or in addition to the position, further properties of a manufacturing product (12a, 12b). In particular, it is possible that the image classifier (60) ascertains whether a manufacturing product (12a, 12b) is defective and/or damaged. In this case, actuator (10) may be controlled in such a way that the manufacturing machine (11) sorts out a defective and/or damaged manufacturing product (12a, 12b).

Figure 4:
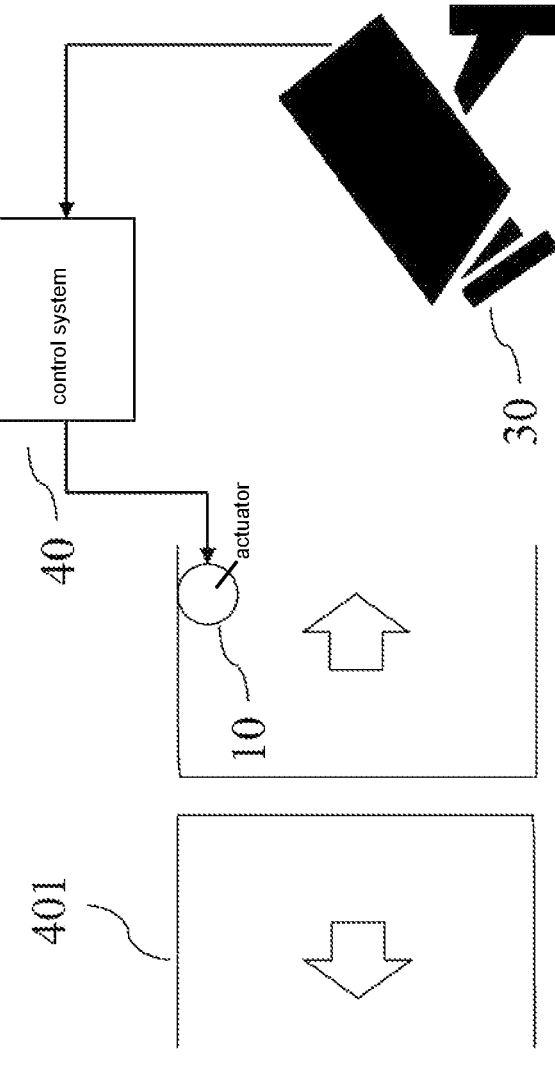
FIG. 4 shows schematically an exemplary embodiment for controlling an access system, in accordance with the present invention.
Figure 4:

FIG. 4 shows an exemplary embodiment, in which the control system (40) is used for controlling an access system (300). The access system (300) may comprise a physical access control, for example a door (401). Sensor (30) may be in particular a video sensor or thermal image sensor, which is configured to detect an area in front of the door (401). Model (60) may therefore be understood as an image classifier. The image classifier (60) may be used to interpret a detected image. In particular, image classifier (60) is able to detect persons in an input image (x) transmitted to it. If multiple persons were simultaneously detected, then by associating the persons (that is, the objects) with one another it is possible for example to ascertain the identity of the persons particularly reliably, for example by an analysis of their movements.

Actuator (10) may be a lock, which, as a function of the control signal (A), unblocks the access control, or does not unblock the access control, for example door (401). For this purpose, the control signal (A) may be selected as a function of the output signal (y) ascertained by the image classifier (60) with respect to the input image (x). It is possible, for example, that the output signal (y) comprises information, which characterizes the identity of a person detected by the image classifier (60), and that the control signal (A) is selected on the basis of the identity of the person.

It is also possible to provide a logical access control in place of the physical access control.

Figure 5:
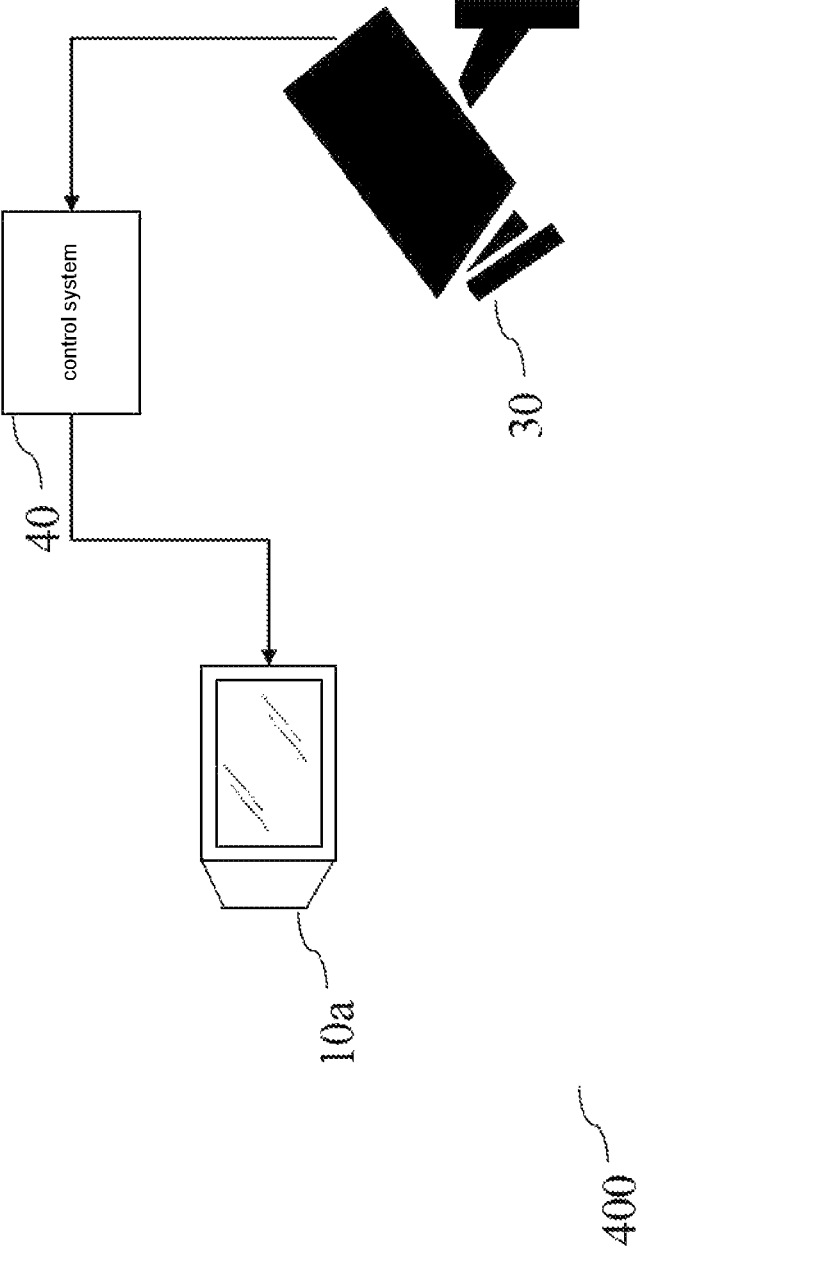
FIG. 5 shows schematically an exemplary embodiment for controlling a surveillance system, in accordance with the present invention.

FIG. 5 shows an exemplary embodiment, in which the control system (40) is used for controlling a surveillance system (400). This exemplary embodiment differs from the exemplary embodiment shown in FIG. 4 by the fact that in place of actuator (10) the display unit (10a) is provided, which is controlled by control system (40). For example, sensor (30) may record an input image (x), in which at least one person is seen, and the position of the at least one person is detected by the image classifier (60). The input image (x) may be displayed on the display unit (10a), it being possible for the detected persons to be displayed highlighted in color.

Figure 6:
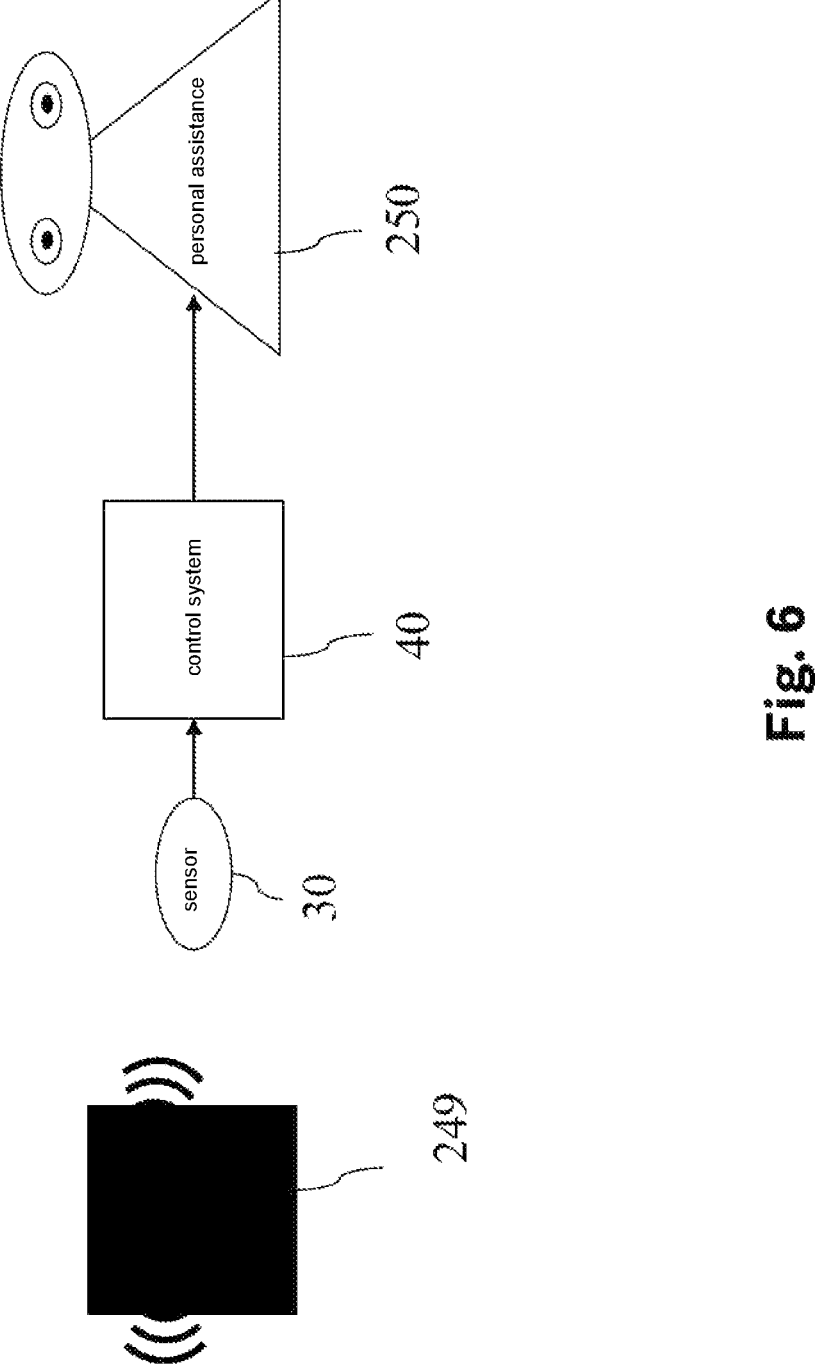
FIG. 6 shows schematically an exemplary embodiment for controlling a personal assistant, in accordance with the present invention.

FIG. 6 shows an exemplary embodiment, in which the control system (40) is used for controlling a personal assistant (250). Sensor (30) is preferably an optical sensor, which receives images of a gesture of a user (249), for example a video sensor or a thermal image camera. In this case, model (60) is an image classifier.

As a function of the signals of sensor (30), control system (40) ascertains a control signal (A) of the personal assistant (250), for example, in that the image classifier (60) performs a gesture detection. This ascertained control signal (A) is then transmitted to the personal assistant (250), and the latter is controlled accordingly. The ascertained control signal (A) may be selected in particular in such a way that it corresponds to an assumed desired control action on the part of the user (249). This assumed desired control action may be ascertained on the basis of the gesture detected by the image classifier (60). Depending on the assumed desired control action, the control system (40) may then select the control signal (A) for transmission to the personal assistant (250) and/or select the control signal (A) for transmission to the personal assistant (250) according to the assumed desired control action.

This corresponding control action may include for example that the personal assistant (250) retrieves information from a database and reproduces it so that the user (249) is able to receive it.

Instead of the personal assistant (250), it is also possible for a household appliance (not shown) to be provided, in particular a washing machine, a range, an oven, a microwave or a dishwasher, so as to be controlled accordingly.

Figure 7:
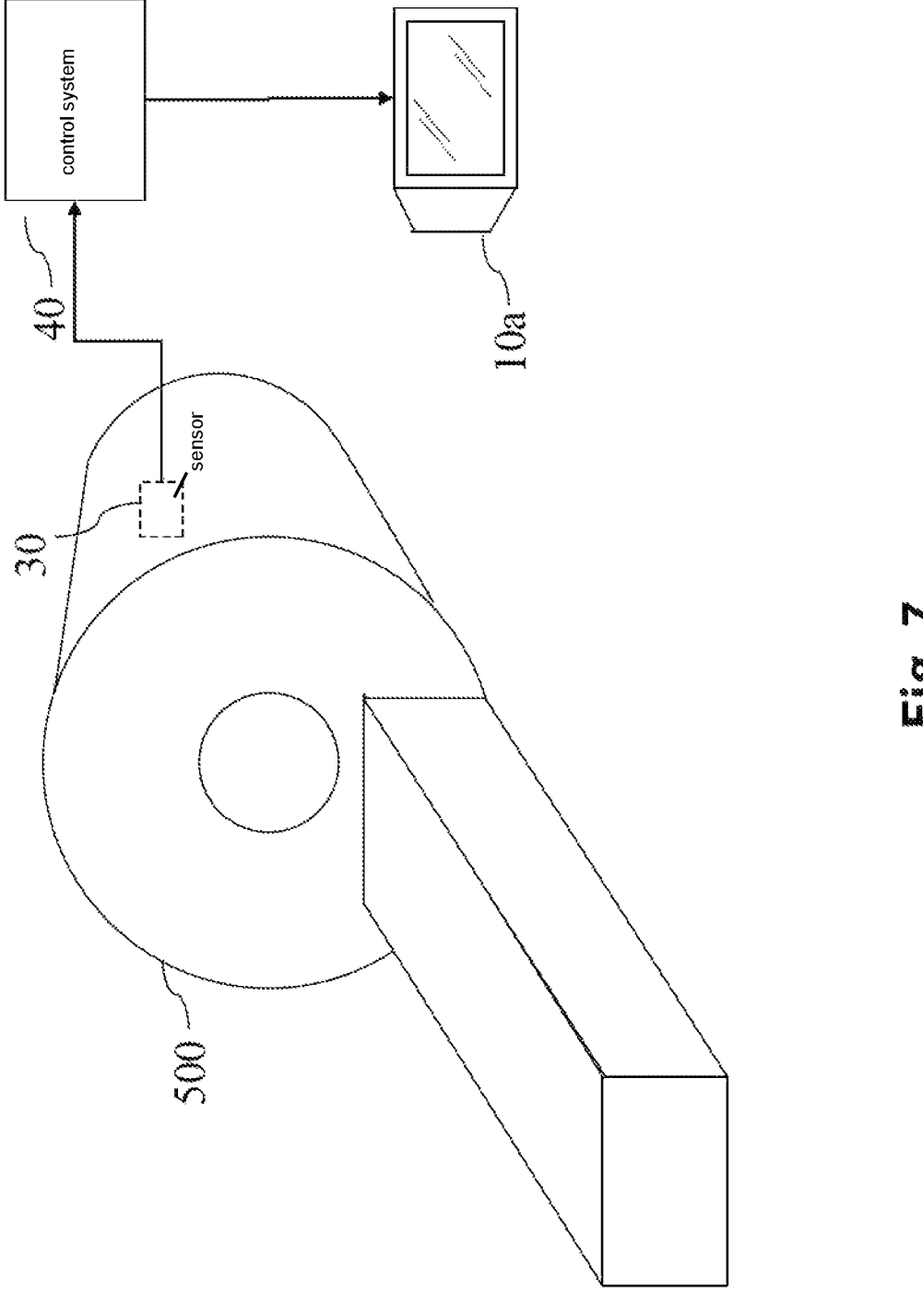
FIG. 7 shows schematically an exemplary embodiment for controlling a medical imaging system, in accordance with the present invention.

FIG. 7 shows an exemplary embodiment, in which the control system (40) is used for controlling a medical imaging system (500), for example and MRI, X-ray or ultrasound device. Sensor (30) may be an imaging sensor, for example. Model (60) may therefore be understood as an image classifier. Control system (40) controls display unit (10a).

Sensor (30) is configured to ascertain an image of a patient, for example an X-ray image, an MRI image or an ultrasound image. At least one portion of the image is transmitted to image classifier (60) as an input image (x).

The image classifier (60) may be configured, for example, to classify different types of a tissue detected in the input image (x), for example via semantic segmentation.

It is then possible to select the control signal (A) in such a way that the ascertained types of tissue are displayed on the display unit (10a) highlighted in color.

In further exemplary embodiments (not shown), the imaging system (500) may also be used for non-medical purposes, for example in order to ascertain material properties of a workpiece. For this purpose, the imaging system (500) may record an image of the workpiece. In this case, image classifier (60) may be configured in such a way that it receives at least a portion of the image as input image (x) and classifies it with respect to the material properties of the workpiece. This may be accomplished for example via a semantic segmentation of the input image (x). The classification ascertained in this manner may be displayed for example on the display device (10a) together with the input image.

Figure 8:
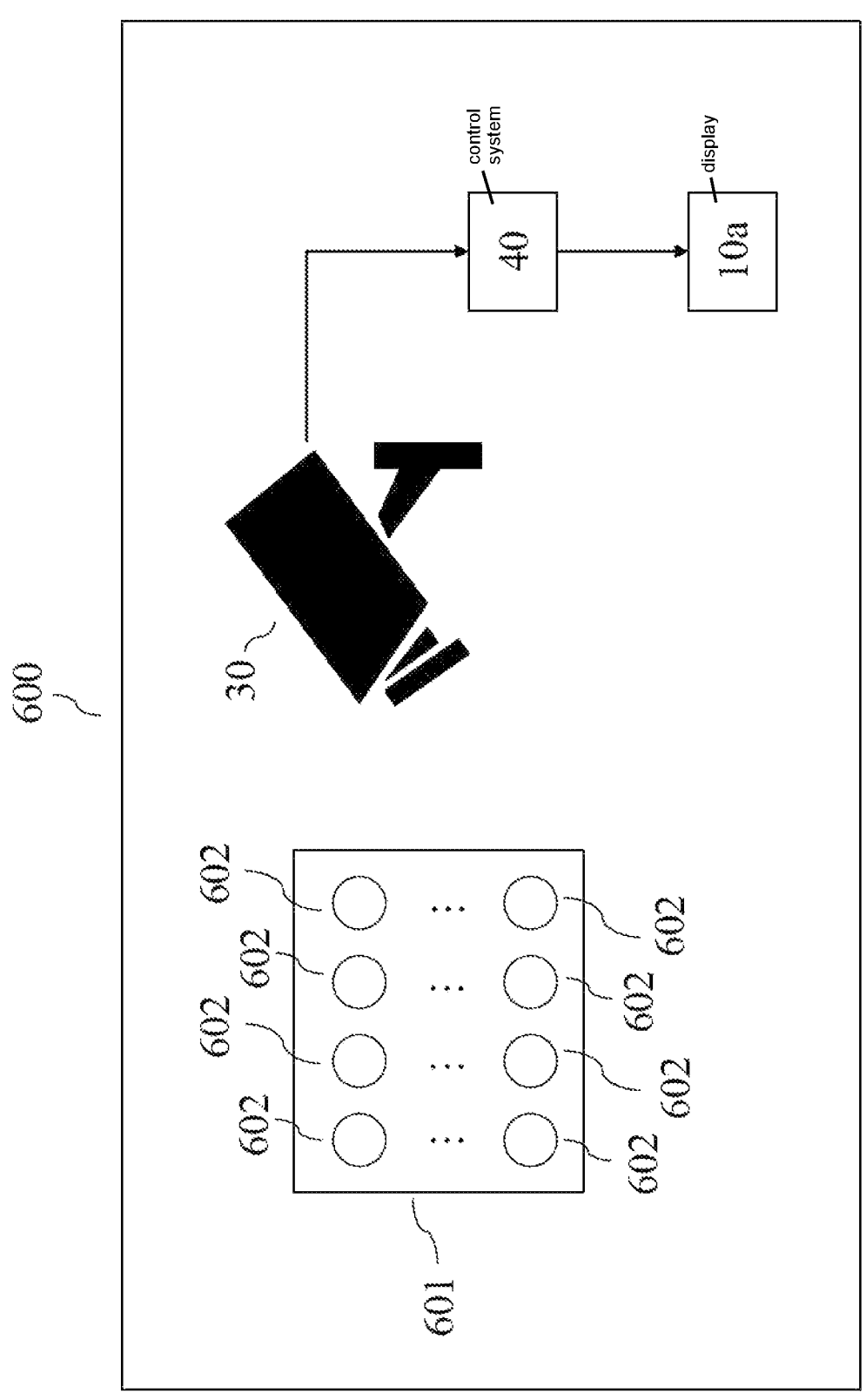
FIG. 8 shows schematically an exemplary embodiment of a medical analyzer device, in accordance with the present invention.

FIG. 8 shows an exemplary embodiment, in which the control system (40) controls a medical analyzer device (600). The analyzer device (600) is supplied with a microarray (601), which comprises a plurality of test fields (602), a specimen having been applied to the test fields. The specimen may come from a swab of a patient, for example.

The microarray (601) may be a DNA microarray or a protein microarray.

The sensor (30) is configured to record the microarray (601). The sensor (30) may be in particular an optical sensor, preferably a video sensor. Model (60) may therefore be understood as an image classifier.

Image classifier (60) is configured to determine the result of an analysis of the specimen on the basis of an image of the microarray (601). In particular, the image classifier may be configured to classify on the basis of the image whether the microarray indicates the presence of a virus within the specimen.

It is then possible to select the control signal (A) in such a way that the result of the classification is displayed on the display device (10a).

The term "computer" comprises any device for processing specifiable calculation rules. These calculation rules may exist in the form of software, or in the form of hardware, or in a mixed form of software and hardware.

In general, a plurality may be understood to be indexed, i.e. a unique index is assigned to each element of the plurality, preferably by assigning successive integers to the elements contained in the plurality. Preferably, if a plurality N comprises elements, where N is the number of the elements in the plurality, the integers from 1 to N are assigned to the elements.

What is claimed is:

1. A computer-implemented method for ascertaining a classification and/or a regression result based on the plurality of sensor values, the method comprising the following steps:

ascertaining a plurality of hypotheses regarding a missing sensor value using a machine learning system, wherein the missing sensor value is determined to be missing on the basis of a checksum of the sensor values;

ascertaining a plurality of outputs, each output of the plurality of outputs being ascertained based on a plurality of sensor values and a hypothesis and the output characterizing a classification and/or a regression result, wherein a model is configured to perform the classification and/or the regression, and wherein the plurality of outputs is ascertained by supplying the model with each respective hypothesis in place of the missing sensor value;

providing an aggregation of the plurality of outputs as the classification and/or the regression result; and providing an actuator configured to be controlled based on the classification and/or based on the regression result and/or based on a dispersion value, the actuator being configured to effect an operation of a technical system.

2. The method as recited in claim 1, wherein each sensor value characterizes a pixel of an image and/or each sensor value characterizes a voxel in a 3D image and/or each sensor value characterizes a value of an audio signal and/or each sensor value characterizes a measurement of a piezoelectric sensor.

3. The method as recited in claim 1, wherein the machine learning system ascertains each hypothesis based on the plurality of sensor values.

4. The method as recited in claim 3, wherein the machine learning system includes a conditional normalizing flow, by which the hypothesis is ascertained based on the plurality of sensor values.

5. The method as recited in claim 1, wherein the dispersion value characterizing a dispersion of the plurality of outputs.

6. The method as recited in claim 5, wherein an actuator is controlled based on the classification and/or based on the regression result and/or based on the dispersion value.

7. The method as recited in claim 1, wherein the machine learning system is trained based on a training data set, the training data set including a plurality of training data, each training datum including a plurality of sensor values, and the training comprises the following steps:

selecting a training datum from the training data set;

selecting a sensor value of the training datum;

training the machine learning system in such a way that the machine learning system ascertains the selected sensor value based on the sensor values of the training datum except for the selected sensor value.

8. The method as recited in claim 7, wherein the training datum is randomly selected from the plurality of training data and/or the sensor value is randomly selected from the plurality of sensor values of the training datum.

9. A control device, which is configured to control an actuator, the control device configured to:

ascertain a plurality of hypotheses regarding a missing sensor value using a machine learning system, wherein the missing sensor value is determined to be missing on the basis of a checksum of the sensor values;

ascertain a plurality of outputs, each output of the plurality of outputs being ascertained based on a plurality of sensor values and a hypothesis and the output characterizing a classification and/or a regression result, wherein a model is configured to perform the classification and/or the regression, and wherein the plurality of outputs is ascertained by supplying the model with each respective hypothesis in place of the missing sensor value;

provide an aggregation of the plurality of outputs as the classification and/or the regression result; and control the actuator based on the classification and/or based on the regression result, the actuator being configured to effect an operation of a technical system.

10. A non-transitory machine-readable storage medium on which is stored a computer program for ascertaining a classification and/or a regression result based on the plurality of sensor values, the computer program, when executed by a processor, causing the processor to perform the following steps:

ascertaining a plurality of hypotheses regarding a missing sensor value using a machine learning system, wherein the missing sensor value is determined to be missing on the basis of a checksum of the sensor values;

ascertaining a plurality of outputs, each output of the plurality of outputs being ascertained based on a plurality of sensor values and a hypothesis and the output characterizing a classification and/or a regression result, wherein a model is configured to perform the classification and/or the regression, and wherein the plurality of outputs is ascertained by supplying the model with each respective hypothesis in place of the missing sensor value; and providing an aggregation of the plurality of outputs as the classification and/or the regression result, wherein an actuator is controlled based on the classification and/or based on the regression result and/or based on a dispersion value, the actuator being configured to effect an operation of a technical system.

\* \* \* \* \*